Patented Jan. 20, 1953

2,626,233

UNITED STATES PATENT OFFICE 2,626,233

CATALYTIC CRACKING OF HYDROCARBONS IN THE PRESENCE OF ADDED GASEOUS OLEFINS

Charles N. Kimberlin, Jr., and Elroy M. Gladrow, Baton Rouge, La., assignors to Standard Oil Development Company, a corporation of Delaware No Drawing. Application August 5, 1950, Serial No. 177,960

8 Claims. (Cl. 196—52)

The present invention relates to the catalytic conversion of hydrocarbons of relatively high molecular weight into hydrocarbon products of lower boiling molecular weight and boiling range. More specifically, the invention pertains to the catalytic cracking of predominantly saturated relatively high molecular weight hydrocarbons or hydrocarbon mixtures to form directly lower molecular weight hydrocarbons having a relatively high degree of unsaturation. This is accomplished in accordance with the present invention by carrying out the cracking operation in the presence of normally gaseous olefins, particularly ethylene and propylene acting as hydrogen acceptors.

Catalytic cracking processes of many types are well known in the art and have been widely practiced for a long time in the petroleum industry particularly for the production of motor fuel range hydrocarbons from heavier hydrocarbon oils mostly of the gas oil or higher boiling ranges. These processes normally employ such catalysts as various natural or treated clays, various composites of silica gel with alumina, magnesia and/or boria, activated alumina, activated carbon, etc., at temperatures of about 700°–1100° F., pressures ranging from subatmospheric to several hundred atmospheres and widely varying feed rates in fixed bed, moving bed, fluid catalyst or suspensoid operation, specific conditions depending on the character of the feed and the products desired.

Known catalytic cracking processes of these types generally yield a more aromatic and highly branched product than thermal cracking processes and, therefore, motor fuels of a higher octane rating that is of a better antiknock quality. However, in spite of this substantial improvement over thermal cracking, the degree of unsaturation attainable by catalytic cracking alone is in most cases lower than desirable to produce a motor fuel suitable for the operation of modern high compression engines without further treatment. This is particularly the case when highly paraffinic cracking feed stocks are used which, upon catalytic cracking on synthetic gel catalysts, yield gasolines having Research octane numbers rarely in excess of about 90–93 and in the case of activated carbon catalysts of only about 75–80. Such gasolines may be further treated, usually by suitable reforming or dehydrogenation processes, to attain a desired degree of unsaturation and anti-knock rating. Similar difficulties arise when it is desired to produce low boiling olefins for other purposes from higher molecular weight paraffinic hydrocarbons by catalytic cracking. When synthetic gel catalysts are used for this purpose, a product rich in branched-chain hydrocarbon is obtained which is undesirable for this specific purpose. In the case of activated carbon catalyst the unsaturation of the product is undesirably low. In most cases the cracked hydrocarbons must be dehydrogenated in a second stage to afford satisfactory yields of olefins without excessively expensive separation and refining procedures. The present invention substantially alleviates these difficulties.

In accordance with the present invention, the degree of unsaturation of hydrocarbons obtained by catalytically cracking substantially saturated feed stocks is greatly increased by carrying out the catalytic cracking operation on conventional cracking catalysts in the presence of substantial proportions of added normally gaseous olefins, particularly ethylene and propylene. While the reaction mechanism of this process is not fully understood it is believed that the catalytic cracking operation primarily yields unsaturated cracked hydrocarbons and equivalent proportions of reaction intermediates which latter will at least in part recombine with the cracked products to resaturate the same unless they are made to undergo reactions with other materials. The gaseous olefins added probably act as hydrogen acceptors to react with substantial proportions of these reaction intermediates before the latter may react with the unsaturated cracked products.

It has been known for some time that certain catalytic dehydrogenation or aromatization reactions may be promoted by the use of hydrogen acceptors including various olefins. However, these known processes are carried out at substantially non-cracking reaction conditions and in the presence of special catalysts such as sulfuric acid, fluosulfonic acid, hydrofluoric acid, and the like having a specific activity for the transfer of hydrogen from relatively saturated to relatively unsaturated hydrocarbons. It could not be foreseen, therefore, that the addition of gaseous olefins in a reaction involving the cracking of hydrocarbons on conventional cracking catalysts at typical cracking condiitions and in the absence of specific hydrogen transfer catalysts might increase the yield of unsaturated cracked products.

The process of the present invention may be carried out at temperatures ranging from about 800° to about 1050° F., pressures of about 0 to about 100 p. s. i. g., and liquid feed rates of about 0.3–8 v./v./hr. Conventional catalytic cracking feed stocks such as paraffinic, naphthenic or mixed-base gas oils or heavier hydrocarbon oils may be used for the production of high octane motor fuels, or normal high molecular weight paraffins such as cetane or petroleum waxes may be used for the production of straight-chain olefins. While all type of conventional cracking catalysts mentioned above may be employed, activated carbon is a preferred catalyst for the process of the invention because it is less susceptible to deactivation by carbon deposition than clay or silica gel type catalysts. Activated carbon due to its low isomerizing activity is also particularly suited for the production of straight-chain olefins from various high molecular weight paraffins in accordance with the invention. The proportions of normally gaseous olefins added may vary over a wide range. However, for best results these olefins should be added at least in equimolar proportions and preferably in a molar excess with reference to the hydrocarbons to be cracked. Mol ratios of feed hydrocarbon/gaseous olefins of about 0.5–0.95 are best suitable for most purposes.

The following experimental data will serve to illustrate the advantages afforded by operating in accordance with the invention. In two comparative experiments cetane alone on the one hand and a mixed feed of cetane plus ethylene on the other hand were cracked in fixed bed operation on an activated carbon catalyst prepared by treatment of bituminous coal coke with steam at 1500°–1600° F. In both experiments the temperature was about 950° F., the pressure about atmospheric and the feed rate about 2 liquid volumes of cetane per volume of catalyst per hour. In the experiment using the mixed cetane-ethylene feed a cetane/$C_2H_4$ mol ratio of 0.81 was employed. Total conversion of cetane into lower molecular weight hydrocarbons was 84.1 weight per cent in the experiment using ethylene as compared to 85.8 weight per cent when using cetane alone. The normally liquid cracking products were fractionated and the olefin content and bromine number of the fractions were determined. The results of these determinations are tabulated below:

*Table I*

| Feed | Cetane+$C_2H_4$ | | | Cetane | | |
|---|---|---|---|---|---|---|
| | Vol. percent of Feed | | Br. No. | Vol. percent of Feed | | Br. No. |
| | Total | Olefins | | Total | Olefins | |
| Liquid Products Boiling Range of Fraction (° F.): | | | | | | |
| $C_5$ (55–107) | 5.0 | 2.26 | | 7.4 | 2.78 | |
| $C_6$ (107–165) | 8.8 | 3.26 | 73 | 7.4 | 1.92 | 52 |
| $C_7$ (165–212) | 8.8 | 3.00 | 56 | 9.1 | 2.09 | 38 |
| $C_8$ (212–257) | 9.4 | 2.54 | 40 | 7.8 | 1.56 | 29 |
| $C_9$ (257–302) | 11.5 | 2.76 | 31 | 10.0 | 1.50 | 20 |
| $C_{10}$–$C_{12}$ (302–430) | 22.0 | 3.96 | 20 | 29.4 | 3.23 | 12 |
| Totals | 65.5 | 17.8 | | 71.1 | 13.1 | |

The above data show that in each fraction, with the single exception of the $C_5$-cut, the olefin content was substantially higher in the case of the experiment employing ethylene as compared with the use of cetane alone. Calculation of the $C_2$ product balance shows that very little of this material is converted to other products. Pertinent data are summarized in Table II below:

*Table II*

| Feed | Cetane+$C_2H_4$ | | Cetane | |
|---|---|---|---|---|
| | Mols In | Mols Out | Mols In | Mols Out |
| $C_2H_4$ | 1.847 | 1.332 | 0.0 | 0.106 |
| $C_2H_6$ | 0.0 | 0.918 | 0.0 | 0.317 |
| Net gain in $C_2$ | 0.403 | | 0.423 | |

These data also demonstrate that the production of $C_2$-hydrocarbons from the cracking reaction is not materially influenced by the addition of the ethylene to the feed. It follows that the gaseous olefins produced in the cracking reaction, including ethylene and propylene may be recycled without detriment to the cracking reaction to serve as hydrogen acceptors in accordance with the invention. Such a recycle operation constitutes a specific modification of the invention.

The process of the invention may be applied to the production of motor fuels from gas oil range or higher boiling conventional cracking feed stocks for example as follows.

A wide cut, preferably paraffinic, gas oil boiling in the range of about 500°–900° F. is introduced into a cracking zone containing an activated carbon catalyst maintained at a temperature in the range of 800°–1050° F., preferably 900°–1000° F., at substantially atmospheric pressure. The gas oil feed rate is maintained within the range of about 0.3–8 v./v./hr. (volumes of gas oil per volume of activated carbon catalyst per hour) preferably about 1–3 v./v./hr., depending upon the conversion range desired. Along with the gas oil feed gaseous olefins, preferably ethylene are introduced into the cracking zone at a rate of about 400 to 1,000 cu. ft. per barrel of gas oil feed. The cracking of the gas oil feed is continued until the activated carbon catalyst has become substantially deactivated, which may take place after a cracking period of about one to four hours. The deactivated catalyst is reactivated by treatment with steam or carbon dioxide containing gases at temperatures in the range of 1300°–1700° F., preferably 1500°–1600° F. for 10 minutes to two hours depending upon the temperature, the higher the temperature the shorter the time. Small amounts of air may be included in the regeneration gas to burn a part of the carbon and thus supply heat for the regeneration. After regeneration the activated carbon catalyst is ready for use in another cracking cycle as described above. The product from the cracking step is distilled into a gaseous fraction, a gasoline cut and a bottoms cut comprising unconverted gas oil. A portion of the latter may be recycled if desired. The gaseous fraction is rich in olefins which may be recycled to provide a part of the gaseous olefin feed.

The process of the invention may be carried out in fixed bed, moving bed, fluid catalyst or suspensoid operation as will be readily understood by those skilled in the art.

Reference is made to copending application, Serial No. 135,534, filed on December 28, 1949, and issued concurrently herewith which specifically claims the catalytic dehydrogenation of naphthenes to aromatics.

The foregoing description and exemplary operations have served to illustrate specific embodiments of the invention but are not intended to be limiting in scope.

What is claimed is:

1. The process of cracking essentially liquid saturated hydrocarbon cracking feed stocks to form more unsaturated hydrocarbons of a lower molecular weight, which comprises contacting the said saturated hydrocarbon feed stock at temperatures of about 800–1050° F. and at substantially atmospheric pressure with an activated carbon catalyst in a conversion zone in the presence of a normally gaseous olefin added to the conversion zone in at least equimolar proportions with reference to the hydrocarbons to be converted, and recovering from such conversion zone an effluent rich in unsaturated hydrocarbons.

2. The process according to claim 1 wherein the feed stock comprises cetane.

3. The process according to claim 1 wherein the normally gaseous olefin has 2 to 3 carbon atoms per molecule.

4. The process according to claim 1 wherein the activated carbon catalyst is prepared by treatment of bituminous coal coke with steam at 1500 to 1600° F.

5. The process according to claim 1 wherein the feed stock is a gas oil and is introduced into the conversion zone at a feed rate ranging between about 0.3 and 8 volumes of liquid feed per volume of catalyst per hour.

6. The process according to claim 5 wherein the normally gaseous olefin is ethylene and wherein the mol ratio of feed stock to ethylene is between about 0.5 and 0.95.

7. The catalytic process for producing high octane motor fuels which comprises introducing a paraffinic gas oil boiling in the range of about 500 to 900° F. into a catalyst containing cracking zone at a feed rate of about 1 to 3 liquid volumes of gas oil per volume of catalyst per hour, contacting the gas oil in the cracking zone at a temperature of 900–1000° F. and at substantially atmospheric pressure with the catalyst which is an activated carbon prepared by treatment of bituminous coal coke with steam at 1500 to 1600° F., simultaneously introducing into said cracking zone about 400 to 1000 standard cubic feet of ethylene per barrel of gas oil feed, and recovering from said cracking zone product vapors rich in unsaturated hydrocarbons of the motor fuel boiling range.

8. The process according to claim 7 wherein the product vapors are separated into normally liquid products and gases rich in ethylene, and the latter gases are returned to the cracking zone to supply at least a portion of the ethylene required.

CHARLES N. KIMBERLIN, Jr.
ELROY M. GLADROW.

REFERENCES CITED

The following references are of record in the file of this patent:

UNITED STATES PATENTS

| Number | Name | Date |
|---|---|---|
| 2,251,571 | Howard | Aug. 5, 1941 |
| 2,428,715 | Marisic | Oct. 7, 1947 |
| 2,470,680 | Beuther | May 17, 1949 |